United States Patent [19]

Petty

[11] 4,224,770
[45] Sep. 30, 1980

[54] OUTDOOR GRAIN PIT COVER

[75] Inventor: James A. Petty, Wayside, Miss.

[73] Assignee: Wayside Manufacturing Co., Inc., Wayside, Miss.

[21] Appl. No.: 968,633

[22] Filed: Dec. 12, 1978

[51] Int. Cl.² .............................................. E04H 7/22
[52] U.S. Cl. ...................................... 52/82; 52/3; 52/169.6; 52/169.7; 52/192
[58] Field of Search ................. 52/82, 3, 169.1, 169.6, 52/169.7, 169.14, 192–197; 405/53, 55

[56] References Cited

U.S. PATENT DOCUMENTS

| Re. 26,121 | 12/1966 | Wiegand | 52/169.1 |
|---|---|---|---|
| 625,258 | 5/1899 | Grow | 52/169.6 |
| 2,288,809 | 7/1942 | Larkin et al. | 52/82 |
| 2,724,151 | 11/1955 | Stack | 52/82 X |
| 3,193,058 | 7/1965 | Ebbinghaus | 52/192 X |
| 3,285,014 | 11/1966 | Nachshen | 405/53 |
| 3,592,009 | 7/1971 | Glijnis | 405/53 |
| 3,727,656 | 4/1973 | Luders | 52/3 |
| 3,791,080 | 2/1974 | Sjoberg | 52/82 X |
| 3,807,101 | 4/1974 | Cole | 52/82 |
| 3,943,721 | 3/1976 | Azalbert et al. | 405/55 |

Primary Examiner—J. Karl Bell
Attorney, Agent, or Firm—Clarence A. O'Brien; Harvey B. Jacobson

[57] ABSTRACT

An outdoor grain pit cover is disclosed for excluding of rain water and the like from a pit constructed for below ground temporary storage of grain transportable into and out of the pit by an auger. The cover includes a sleeve for protecting the housing of the auger, and further includes a rectangular hatch or door used to cover a chute or trough for loading grain from the grain pit into trucks when the elevators are being unloaded. Means for stabilizing the cover are also disclosed.

10 Claims, 6 Drawing Figures

U.S. Patent    Sep. 30, 1980    4,224,770
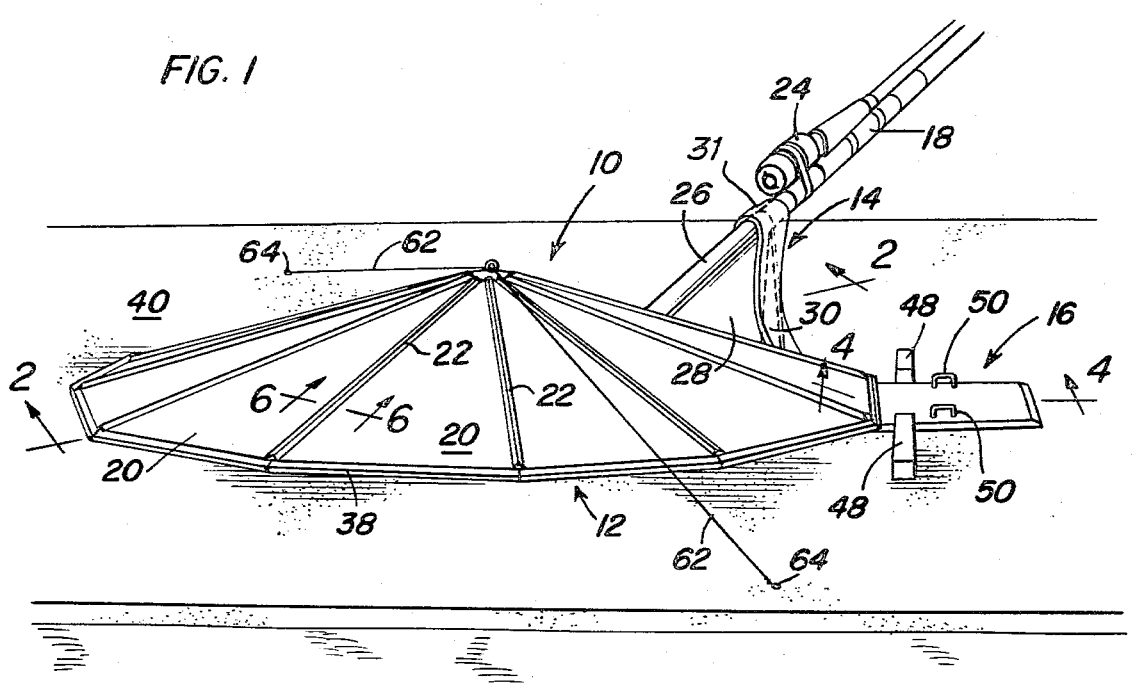
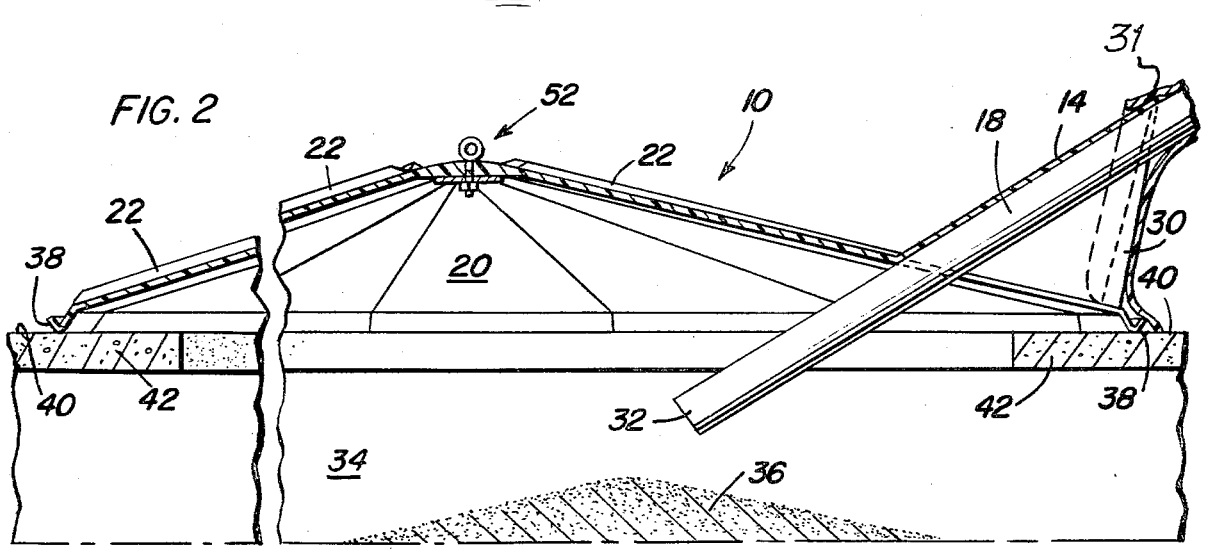
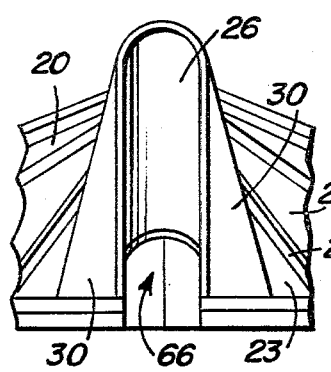
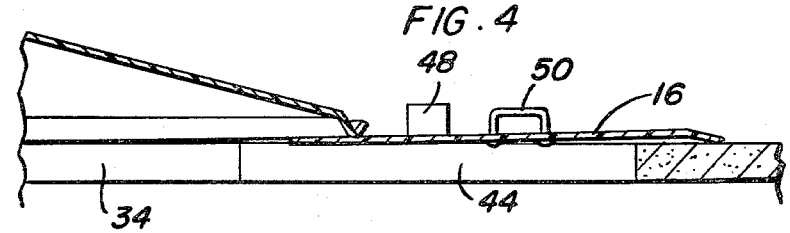
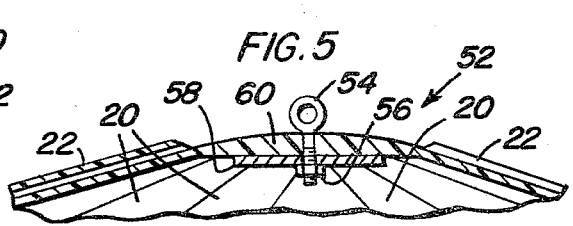
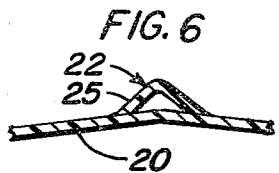

OUTDOOR GRAIN PIT COVER

BACKGROUND OF THE INVENTION

1. Field of the Invention

The invention relates to protection for materials stored outdoors below ground level. More particularly, the invention discloses a grain pit cover for shedding of rain water to protect grain stored in an underground storage pit. A sleeve having an opening located on the periphery of the cover serves to protect the housing of an auger used to transfer grain into and out of the storage pit.

2. Description of the Prior Art

Arrangements for outdoor storage of grain are known in the prior art. For example, U.S. Pat. No. 3,727,656, issued Apr. 17, 1973, to Luders, discloses a grain storage device located within a ground excavation and connected with a feed auger for filling, where the device consists of a flexible plastic sheet material with a filling neck at the apex of pyramidal or conical walls. Such an arrangement, however, lacks the durability of a rigid cover, and further subjects stored grain to effects of the weather, such as collection of rain, moisture or snow. In U.S. Pat. No. 2,874,651, issued Feb. 24, 1959, to Peterson, a portable protecting cover for grain for storage on the surface of the ground is disclosed, but no accommodation for an auger housing is provided. U.S. Pat. No. 4,084,358, issued Apr. 18, 1978, to Winters, shows a tarpaulin cover for above ground grain storage apparatus, and U.S. Pat. No. 3,949,527, issued Apr. 13, 1976, to Double et al, teaches a method for securing stacks of granular materials to the ground with use of a plurality of cables, ground anchors, cover sheets, and the like.

Other related patents are the following:
U.S. Pat. Nos. 1,909,066—May 16, 1933—Nemec
U.S. Pat. No. 3,186,523—June 1, 1965—Brisse
U.S. Pat. No. 3,717,963—Feb. 27, 1973—Sauriol.

A drawback common to prior art grain storage devices is their failure to provide a temporary storage reservoir for use as grain is lifted by an auger into a grain elevator or unloaded from a grain elevator for further loading upon a grain vehicle.

The advantage of durability and security resulting from use of a rigid reinforced material, such as reinforced fiber glass during such temporary storage is apparent, when the element of safety to those working in the vicinity is considered, along with the necessity to protect stored grain.

SUMMARY OF THE INVENTION

It is an object of the present invention to provide a rigid reinforced cover attachable to a presently existing materials storage system consisting of a permanent materials storage bin, a temporary below ground storage pit, and an auger connecting the two.

Another object of the invention is to provide a conical cover constructed to shed rain water and protect grain stored in such a temporary storage pit.

Still another object of the invention is to provide a sleeve to house the auger, while providing protection to the grain from the elements, without impairing operability of the auger, even during inclement weather.

Yet another object of the invention is to promote occupational safety by providing a reinforced rigid temporary grain storage pit cover for below ground temporary grain storage, where the cover is constructed to support the weight of an individual working in the vicinity.

A further object of the invention is to provide a serviceable reinforced cover of a material, such as fiber glass, which is sufficiently light in weight to be easily removable manually.

Yet a further object of the invention is to provide a temporary grain storage pit cover having a rectangular shaped hatch or door used to cover a chute or trough into the grain pit through which grain can be loaded or unloaded.

Another further object of the invention is to provide means for stabilizing the cover, such as by a guide wire or cable drawn over the top of the cover through an eye hook projecting upwardly from the apex of the cover, to help stabilize the cover in position during high winds, the stabilizing means also being useful for mechanically lifting the cover, as by an overhead crane or boom.

These, together with other objects and advantages which will be disclosed hereinafter, are achieved in an apparatus which includes a rigid generally conical fiber glass plate, reinforced with strips of fiber glass on the upper side or lower side of the cover where an eye hook is located on the outside near the apex of the cover and a peripheral sleeve is provided for protection of the housing of an auger used to transfer grain into or out of the storage pit. The cover can further optionally include a hatch used to cover a chute or trough into the grain pit through which grain can be loaded into or unloaded from the pit.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side perspective view of the grain storage pit cover of the present invention illustrating the cover in use with an associated auger assembly.

FIG. 2 is a side elevational view of the cover of FIG. 1 taken substantially upon a plane passing along section line 2—2 on FIG. 1.

FIG. 3 is an enlarged fragmentary side elevational view of the grain pit cover of the present invention, looking into the opening of the sleeve mounted peripherally on the cover and adapted for allowing entrance of the auger housing.

FIG. 4 is a fragmentary sectional view of the hatch assembly associated with the cover of the present invention, taken substantially upon a plane passing along section line 4—4 on FIG. 1.

FIG. 5 is an enlarged, fragmentary, sectional view of the cover of the present invention, taken near the apex of the cover, showing details of the eye bolt for securing the cover to the ground.

FIG. 6 is a fragmentary, enlarged sectional view, taken substantially upon a plane passing along section line 6—6 on FIG. 1, showing details of a reinforcing rib of the cover of the present invention.

DESCRIPTION OF THE PREFERRED EMBODIMENT

The device of the present invention, designated generally by the numeral 10 in FIG. 1, comprises a pit cover portion 12, an auger sleeve 14, and hatch 16.

Auger housing 18 is receivable within and below sleeve 14. Pit cover 10 is made up of triangular, substantially planar, segments arranged to form frusto-conical pit cover 10 as seen in FIG. 1. Although 13 such segments are illustrated, including 12 substantially identical segments 20 and one segment 23 which includes sleeve 14, it is contemplated that any number of segments arranged in the generally frusto-conical configuration taught by the present invention can be successfully employed. Segments 20, although shown as separate triangular sections joined together along marginal ridges 22 in FIG. 1, can, instead, be formed integrally in a single plate, as by molding, pressing, casting or other conventional technique well-known to those skilled in the art. Such a joint between adjacent segments is illustrated in FIG. 6. Reinforcing ribs 22 are shown in the figures on the upper surface of pit cover 10 and, although it is preferred to place reinforcement ribs 22 on the upper surface, it is also possible to situate reinforcing means on the lower surface of the cover. Each rib 22 is in the shape of an inverted V-shaped channel having fins 25, each of which is attached along the edge of adjacent segments 22.

Sleeve 14 fits over auger housing 18, which also supports auger motor 24. Sleeve 14 comprises a roof portion 26, lateral walls 28, and wings 30. As is best seen in FIGS. 2 and 3, the position of auger housing 18 can be adjusted within sleeve 14 to permit movement of auger tip 32 to a desired location within pit 34 beneath pit cover 10. Such movement of auger housing 18 and tip 32 permits control of deposition of grain 36 within pit 34, or removal of grain 36 from the supply therein. Pit cover 10 includes a periphery 38 which rests upon surface 40, which can be a concrete slab 42, or, alternatively, can be the ground surface. Preferably, however, pit 34 is lined with a suitable material to prevent ground moisture, insect pests, and the like, from coming into contact with grain 36. Such liner means, not shown in the drawings, can include any conventional liner, such as concrete walls, brick, blocks, or the like.

Pit 34 preferably has a chute or passageway 44 extending upwardly and peripherally outwardly to permit unloading of grain directly from pit 34 without removal of pit cover 10. Hatch 16 is provided over chute 44 in order to provide a cover for the extension of pit 34 represented by chute 44. Hatch 16 is connected to one of segments 20 of pit cover 10 by hinge means to permit hatch 16 to be lifted upwardly and to permit access to chute 44 from above. Alternatively, hatch 16 can be secured beneath periphery 38 of pit cover 10 in the manner shown in FIG. 4, with periphery 38 overlapping hatch 16 to sealingly provide protection against the elements. Stops 48 are provided adjacent hatch 16 in order to provide a resting point for wheels of a truck, cart, or other vehicle, which can then be unloaded through chute 44 below hatch 16 after hatch 16 is lifted in the manner described above. Handles 50 are provided on hatch 16 to facilitate lifting or handling thereof.

Pit cover 10 is provided with an apex assembly 52, details of which are best seen in FIG. 5. Apex assembly 52 comprises eye hook 54, threaded at its lower end to receive bolt 56, for tightening eye hook 54 against pressure plate 58. Pressure plate 58 bears against the lower inner surface of thickened apex portion 60, which is fastened by adhesive to segments 20 and 23, in the case where such segments are individually manufactured for bonding near reinforcing ribs 22, or is integral with segments 20 in the construction in which segments 20 are molded, cast, or otherwise formed as an integral whole. Eye hook 54 functions as a stabilizer for the entire grain pit cover assembly when guide wire 62, fastenable by ground anchors 64 is passed through eye hook 54 to prevent pit cover 10 from being moved about during periods of high winds. In addition, eye hook 54 provides a point of attachment for the entire device when lifting by mechanical means, such as an overhead crane or boom, is desirable.

While the grain pit cover of the present invention can be constructed of many materials, for reasons of economy, savings of weight, strength, durability, and imperviousness to moisture, the preferred material of construction of segments 20, reinforcing ribs 22, and hatch 16 is glass fiber reinforced plastic. Handles 50 and eye hook 54, as well as bolt 56 and plate 58, are preferably made of steel. When so constructed of a size typical of conventional grain pits, the entire grain pit cover can be removed by only three men. Alternatively, the cover is removable by mechanical equipment.

Although not illustrated in the drawings, the space beneath arch 66 of sleeve 14 is protected by use of a flexible waterproof cloth-like material draped over housing 18 near the upper portion of arch 66, and filling the remaining gap of arch 66. Such a material, which can be synthetic resin film, such as polyethylene sheet, can be tied or otherwise anchored near the base of arch 66 to securely exclude rain, wind, dust and animal pests during periods of disuse. Wings 30 are particularly advantageous in assisting in securing such material, as well as providing a gusseting or supporting function for sleeve 14.

The foregoing is considered as illustrative only of the principles of the invention. Further, since numerous modifications and changes will readily occur to those skilled in the art, it is not desired to limit the invention to the exact construction and operation shown described, and accordingly, all suitable modifications and equivalents may be resorted to, falling within the scope of the invention.

What is claimed as new is as follows:

1. A protective rigid cover assembly for used in the underground storage of materials, comprising rigid pit cover means for covering an underground pit and for excluding outside access to the pit and a peripherally mounted sleeve to house feed means for introducing materials into the pit and withdrawing stored materials from the pit, wherein said cover means comprises a generally frusto-conical rigid plate for shedding of rain water, said sleeve comprises an arched peripheral opening to permit access into the pit by said feed means, and said cover assembly is for use in the temporary underground storage of grain.

2. The structure as defined in claim 1 wherein said pit cover comprises a plurality of triangular segments arranged in a generally frusto-conical configuration, one vertex of each of said segments converging by forming an apex assembly.

3. The structure as defined in claim 2 wherein said apex assembly includes a thickened apex portion, an eye hook extending upwardly through said thickened apex portion for anchoring of the pit cover to secure the pit cover during exposure to high winds, and for lifting the pit cover upwardly.

4. The structure as defined in claim 3 wherein adjacent segments form a ridge at which reinforcing means are provided for imparting strength and durability to the pit cover.

5. The structure as defined in claim 4 wherein said reinforcing means comprises reinforcing ribs an inverted V-shaped channel having fins, each of which is attached along the edge of adjacent segments.

6. The structure as defined in claim 5 wherein said sleeve is provided with a pair of wings to impart mechanical stability to said arched opening and to provide a base for anchoring attachment of sealing means over the opening for blocking the opening during periods of disuse.

7. The structure as defined in claim 6 wherein said sealing means comprises a water impervious flexible material for sealing said opening and preventing entrance into the pit of rain, snow, animal pests, and the like.

8. The structure as defined in claim 7 wherein said pit has a peripherally and outwardly extending loading chute and said pit cover includes in addition a hatch to cover said chute, said hatch having handle means for upward lifting thereof.

9. The structure as defined in claim 8 wherein said hatch comprises a rectangular plate attached to and pivotable upon the periphery of said pit cover, and said handle means comprises a pair of upwardly extending handles attached to the hatch.

10. The structure as defined in claim 9 wherein said pit cover has a periphery provided with a collecting trough for gathering and directing collected rain water away from said underground pit.

* * * * *